(12) United States Patent
Hande et al.

(10) Patent No.: US 10,262,146 B2
(45) Date of Patent: Apr. 16, 2019

(54) APPLICATION-TO-APPLICATION MESSAGING OVER AN INSECURE APPLICATION PROGRAMMING INTERFACE

(71) Applicant: VMware, Inc., Palo Alto, CA (US)

(72) Inventors: Yogesh Govind Hande, Sandy Springs, GA (US); Shravan Shantharam, Cumming, GA (US); Kalyan Regula, Alpharetta, GA (US); Varun Murthy, Atlanta, GA (US); Bhuvanesh Shanmuga Sundaram, Atlanta, GA (US); Jonathon Deriso, Suwanee, GA (US); Raymond Welch, Alpharetta, GA (US)

(73) Assignee: VMware, INC., Palo Alto, CA (US)

( * ) Notice: Subject to any disclaimer, the term of this patent is extended or adjusted under 35 U.S.C. 154(b) by 150 days.

(21) Appl. No.: 15/380,458

(22) Filed: Dec. 15, 2016

(65) Prior Publication Data

US 2018/0173884 A1  Jun. 21, 2018

(51) Int. Cl.
  *G06F 21/60* (2013.01)
  *H04L 29/08* (2006.01)
  *H04L 9/08* (2006.01)

(52) U.S. Cl.
  CPC ........... *G06F 21/606* (2013.01); *G06F 21/602* (2013.01); *H04L 9/0822* (2013.01); *H04L 67/146* (2013.01)

(58) Field of Classification Search
  CPC ... G06F 21/606; G06F 21/602; H04L 9/0861; H04L 67/146
  See application file for complete search history.

(56) References Cited

U.S. PATENT DOCUMENTS

| | | | |
|---|---|---|---|
| 2005/0050317 A1* | 3/2005 | Kramer | G06F 21/606 713/155 |
| 2008/0215883 A1* | 9/2008 | Fok | H04L 63/0869 713/167 |
| 2015/0100152 A1* | 4/2015 | Barragan Trevino | G06Q 20/322 700/232 |
| 2017/0132429 A1* | 5/2017 | Bell | H04L 9/0861 |

* cited by examiner

*Primary Examiner* — Meng Li
(74) *Attorney, Agent, or Firm* — Thomas | Horstemeyer, LLP (57) ABSTRACT

Disclosed are various approaches for a secure communication session between applications installed on a client device. The secure communication session can be provided over an insecure operating system application programming interface (API). By exchanging session information and encryption data, communications over the insecure API can be secured.

20 Claims, 5 Drawing Sheets

APPLICATION-TO-APPLICATION MESSAGING OVER AN INSECURE APPLICATION PROGRAMMING INTERFACE

BACKGROUND

Multiple applications installed on client devices, such as smartphones, personal computers, or laptops, can be deployed by a single publisher or developer. Applications published by a developer might have the need to securely communicate data between one another. In some instances, applications that are published by different developers might also have the need for secure communication between one another. For example, applications might share data between one another that is sensitive or requires data encryption, such as an authentication credential or keyed-hash message authentication (HMAC) token.

In some operating system environments, such as Windows 10®, the application programming interfaces (API's) provided by the operating system allow applications to communicate between one another in various ways. Some API's allow for secure application-to-application communication through an inter-process communication protocol. Other API's are insecure protocols. For example, the operating system might provide a token store or universal cookie jar where applications can store or retrieve authentication tokens for various uniform resource identifiers (URI's). For example, a browser application can store authentication cookies in the token store, and these authentication cookies can be accessed by other applications installed on the client device.

In many scenarios, communication between applications using a secure application-to-application communication API can be cumbersome for an application developer. The application-to-application API can require coding overhead of hurdles that must be cleared to initiate, use, and then terminate a communication session between applications. In many scenarios, communication through an insecure API provided by the operating system can be a desirable communication medium for applications to communicate certain data between one another due to the ease of using some of these API's for application developers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of systems and methods for secure communication between applications installed on a client device. For example, a first application can send a request to initiate a secure communication session with a second application. The two applications can exchange encryption data and session information from which a secure communication session can be created. The encryption data can include an encryption key or data from which an encryption key can be generated by the first and second applications. The session information can include a session identifier that the applications can embed within one or more communications between the applications.

The encryption data and session information can be exchanged between the applications using a secure application-to-application API to establish a secure communication session. Once the secure communication session is established between the applications, subsequent communications associated with the secure communication session can be made using an insecure API of the operating system. However, communications made using the insecure API can be secured using the encryption data so that no other applications can access the communications.

In one example scenario, one of the applications can be an identity provider application implementing a federated authentication protocol that obtains an authentication token or credential on behalf of other applications installed on a client device. For example, the identity provider application can facilitate single sign-on capabilities for a user in which a user's identity within a particular identity provider is used to authenticate his or her access to various applications.

In this example scenario, it is important that the authentication token or credential obtained by the identity provider application on the client device be securely provided to the application for which the authentication token or credential is obtained. Therefore, the identity provider application and the application for which the authentication artifact is obtained can communicate through a secure communication session in which the identity provider application provides the authentication artifact. The authentication artifact can be provided through an insecure operating system API that is employed to exchange authentication tokens or cookies.

For example, Windows 10® provides application programming interfaces (APIs) that allow an application to register as a local identity provider for a particular identity provider server that is identified by a uniform resource indicator (URI) or uniform resource locator (URL). In the Windows 10® context, an application can register as the web account provider for a particular context (e.g. a URI). The local identity provider can also utilize a universal cookie jar or token store that is provided by the operating system, which is a place where authentication tokens or cookies can be stored by various applications and accessed through operating system APIs.

Accordingly, in one example, when the user launches the identity provider application on the client device, the user is prompted to provide credentials associated with his or her account. The identity provider application can authenticate the user's credentials with an identity provider server and store an authentication token corresponding to a particular application received from the identity provider server in the token store maintained by the operating system. The application for which the token is obtained can retrieve the authentication token from the token store. In this example, the application for which the token is obtained is the "first" application because it is the application requesting a secure communication session, and the identity provider application is the "second" application because it is the application establishing the secure communication session. One example of this disclosure can utilize the token store to exchange communications between applications while layering an encryption methodology atop communications made through the token store.

Figure 1:
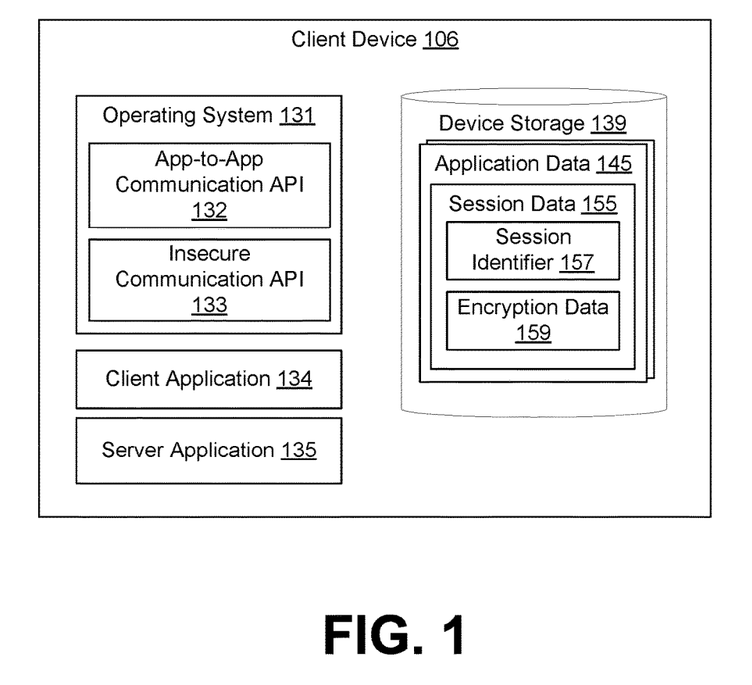
FIG. 1 is a schematic block diagram depicting an example client device according to various examples of the disclosure.

FIG. 1 illustrates an example of a client device 106 in which a secure application-to-application communication protocol can be implemented. The client device 106 can represent a processor-based computer computing device. According to various examples, a client device 106 can be in the form of a desktop computer, a laptop computer, a personal digital assistant, a mobile phone, a smartphone, or a tablet computer system.

The client device 106 can execute an operating system 131 that provides APIs that can be utilized to facilitate secure communication sessions between applications that are installed on the client device 106. The operating system 131 can provide an application-to-application communication API 132 and an insecure communication API 133. The application-to-application communication API 132 represents an inter-process communication API that provides for application-to-application communication between two applications installed on the client device 106. Applications can communicate using the application-to-application communication API 132 by making an API call to send a message to a recipient application. The API call identifies the recipient application by an application identifier. The application identifier can uniquely identify the recipient application with respect to other applications installed on the client device. In the Windows 10® context, an application identifier can be a package family name. The package family name can uniquely identify the application with respect to other applications that can be installed on a device that is running Windows 10®. In some examples, the recipient application can be identified by a bundle identifier or publisher identifier.

As introduced above, an API call using the application-to-application communication API 132 can require the sending application to identify the recipient application by an application identifier. The application-to-application communication API 132 can then generate a message that is sent to the recipient application. The message sent to the recipient application can identify the sending application by the application identifier. In other words, the application-to-application API 132 can embed the application identifier of the sending application within message sent using the API. In some examples, the application identifier of the receiving application can also be embedded within the message. The application identifier of the sending or receiving applications can be embedded into the message in a message header or other message metadata created by the application generating the message of the application-to-application API 132. In this way, the recipient application can validate or verify the identity of the sending application. The application-to-application communication API 132 can also be considered a secure communication interface or secure communication API that is provided by the operating system 131 because messages between applications cannot be accessed by other applications installed or running on the client device 106.

The insecure communication API 133 represents an API that can be used by applications installed on the client device 106 to communicate or share data. In some instances, an insecure communication API 133 represents an API in which communications between applications are not necessarily private. In some cases, data shared through an insecure communication API 133 might be accessible to other applications stored on the client device 106 and by the operating system 131 itself. For example, a token store provided by the operating system 131 might be accessible to multiple applications installed on the client device 106, so data stored in the token store might be accessible to other applications installed on the client device 106 aside from an application that stores data in the token store.

In examples of this disclosure, a client application 134 and a server application 135 can be installed on the client device 106. The client application 134 and server application 135 are shown and referred to as such for ease of illustration and discussion. The client application 134 and server application 135 can represent any application installed or deployed onto the client device 106 that participates in a secure communication session with another application according to examples of the disclosure. The client application 134 and server application 135 are also referred to herein as a first application and second application.

In the context of this disclosure, the client application 134 initiates a request to communicate with a server application 135 in a secure communication session. The server application 135 can then create a session corresponding to the secure communication session. The server application 135, in some examples, can also generate an encryption key or data from which an encryption key is generated. The encryption key can then be used by the client application 134 and server application 135 to secure or encrypt communications between the two applications on the client device 106.

Again, the client application 134 and server application 135 can represent any application that is installed on the client device 106. Applications can be obtained from an application distribution repository or obtained and installed through another mechanism on the client device 106. In either scenario, an application is identified by an application identifier, which can be a package family name or a bundle identifier that identifies the publisher of the application as well as the identity of the application. An application can also be signed by a particular developer certificate to ensure the authenticity of the package family name or bundle identifier. The application identifier is associated with messages routed by the operating system 131 in response to calls made using the application-to-application communication API 132.

The client device 106 can also include device storage 139, which can be mass storage resources of the client device 106. The device storage 139 can include private storage areas that only certain applications or certain operating system components can access. Application data 145 can include settings and preferences that are specific to particular applications installed on the client device 106, such as a client application 134 and server application 135. Application data 145 represents storage that is private to the respective applications that are installed on the client device. In other words, applications installed on the client device 106 can have their own application data 145 in which data can be stored and kept private from other applications by the operating system 131.

In some implementations, the device storage 139 can include public storage areas that can be accessed by some or all applications stored on the client device 106. In one scenario, a public storage area can be accessible through an operating system 131 API or simply be a storage area that can be accessed by one or more applications on the client device 106. For example, the operating system 131 might maintain a token store, which can be a storage area on the client device 106 in which authentication tokens or cookies can be stored by the operating system 131. In a Windows 10® environment, a token store can be thought of as a universal cookie jar or the storage area for the web account manager API provided by the operating system 131. The token store can be accessed through an API provided by the operating system 131. In the Windows 10® context, requests to access the token store through the operating system 131 can be considered an insecure communication API 133 because other applications may also be permitted to access some or all of the data stored in the token store.

To facilitate secure communication sessions between applications, an application, such as a server application 135 can maintain session data 155 within its respective application data 145. Session data 155 can identify one or more secure communication sessions that are established between a client application 134 and a server application 135. The session data 155 can include a session identifier 157 and potentially other data identifying a client application 134 requesting to communicate through a secure communication session. For example, the session data 155 can include an application identifier of the requesting client application 134.

Session data 155 can also include encryption data 159 associated with a secure communication session. The encryption data 159 can include a symmetric key generated by a server application 135 in response to establishing a secure communication session. In one example, the encryption data 159 can include data from which an encryption key can be generated using a particular encryption protocol rather than the encryption key itself. In some examples, the application data 145 can identify other applications that are identified as whitelisted or approved applications with which a secure communication session can be established. In some scenarios, a particular application can be instrumented such that it only establishes a secure communication session with whitelisted applications and does not establish a session with applications that are not whitelisted or that are identified by a blacklist.

Figure 2A:
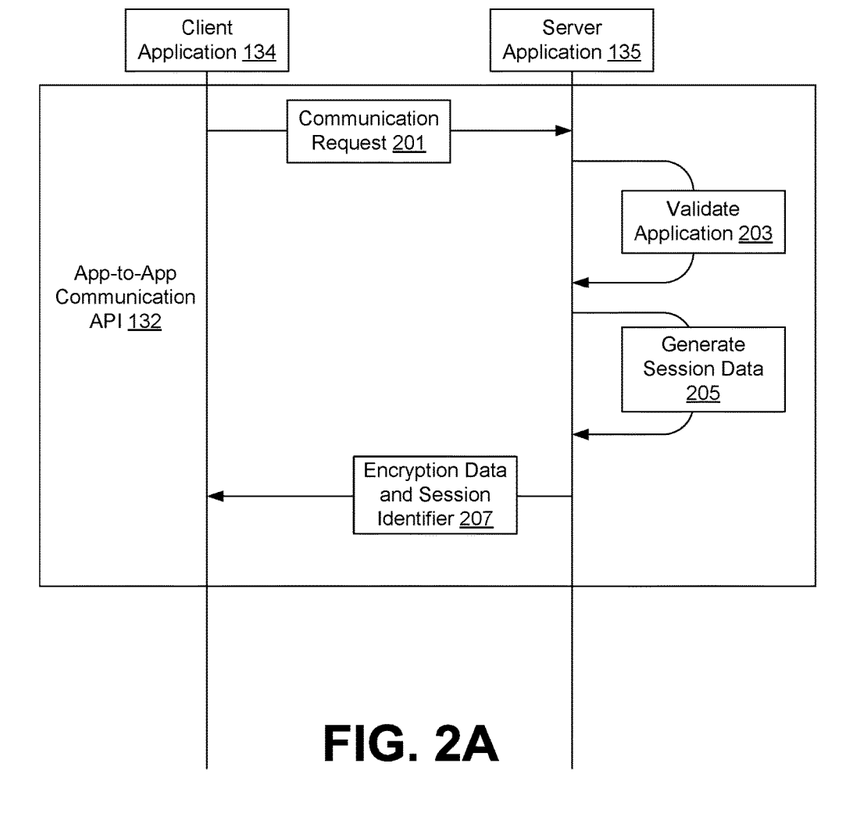
FIG. 2A is a sequence diagram illustrating functionality according to a first example of the disclosure.
Figure 2B:
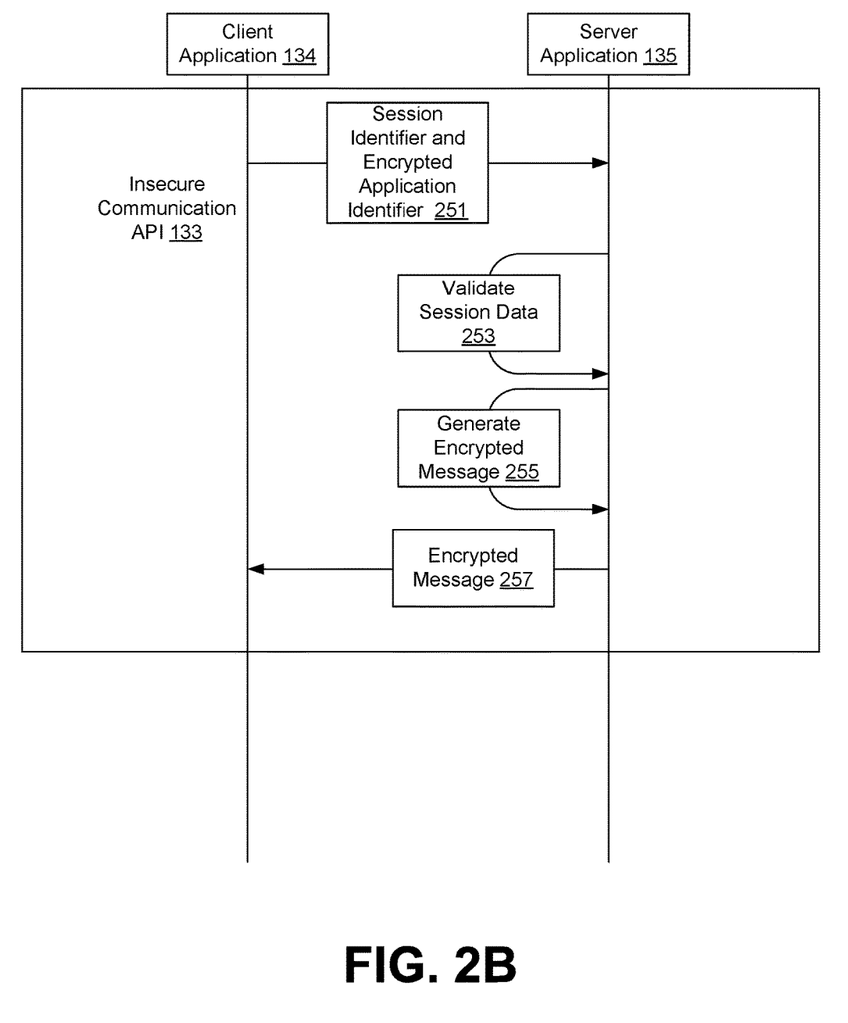
FIG. 2B is a sequence diagram illustrating functionality according to a second example of the disclosure.

To illustrate how two applications installed on a client device can establish and communicate through a secure communication session, reference is made to FIGS. 2A-2B. FIGS. 2A-2B illustrate a sequence diagram that shows interactions between various components on the client device 106. First, in FIG. 2A an example of how the client application 134 and server application 135 can create a secure communication session is shown.

First, at step 201, the client application 134 can transmit a communication request to the server application 135. The request can be sent through the application-to-application communication API 132 which requires the client application 134 to identify the server application 135 using an application identifier, such as by package family name. The communication request can take the form of a request to initiate a secure communication session. Because the request is routed through the application-to-application communication API 132, the operating system 131 delivers the request to the server application 135 and also identifies the application identifier of the client application 134.

At step 203, the server application 135 can validate the client application 134 and the request to initiate the secure communication session. The server application 135 can validate the client application 134 by verifying that the client application 134 is a whitelisted application with which a secure communication session is permitted.

Assuming the application is validated at step 203, at step 205, the server application 135 can generate session data 155 corresponding to the secure communication session with the client application 134. In other words, the server application 135 can create a secure communication session that the client application 134 and server application 135 can use to securely communicate data with one another. The session data 155 can include a session identifier 157 that uniquely identifies the session with respect to other sessions. The session data 155 can also include encryption data 159 with which the session can be secured or encrypted. The encryption data 159 can include a symmetric key, such as a key generated using the Advanced Encryption Standard (AES) standard. The encryption data 159 can also include data that can be used as a seed from which a symmetric key can be generated by the server application 135 and client application 134. The application identifier of the client application 134 can be saved along with the session data 155. The application identifier, in some implementations, can be used to later validate the client application 134 in the secure communication session, as will be described below.

The communications at steps 203 and 205 can be sent without specifying the encryption protocol used to secure the secure communication session. The communications 203 and 205 can also be sent without specifying the type of symmetric key that should be generated to secure the secure communication session.

At step 207, the server application 135 can transmit a session identifier 157 corresponding to the session data 155 as well as the encryption data 159 corresponding to the secure communication session. In some examples, the server application 135 can generate an encryption key and store the key within the session data 155. In one scenario, the encryption key itself can be sent to the client application 134 at step 207. In another scenario, seed data from which the encryption key can be independently generated by the client application 134 can be sent at step 207. The session identifier 157 and encryption data 159 can be sent to the client application 134 in a message using the application-to-application communication API 132.

In some examples, upon receiving the encryption data 159 and session identifier 157, the client application 134 can create session data 155 in its respective application data 145. In one example, the client application 134 can generate a symmetric key corresponding to the encryption data 159, which can be used to secure subsequent communications in the secure communication session.

Now that the secure communication session has been created, reference is now made to FIG. 2B. FIG. 2B illustrates how the client application 134 and server application 135 can communicate within the secure communication session generated by the server application 135. The communications can take place over an insecure communication API 133 provided by the operating system 131, such as a token store API that is used by applications to store or exchange authentication cookies on the client device 106.

At step 251, to initiate communications within the session, the client application 134 can send a validation message to the server application 135. The validation message can be encrypted using the encryption data 159 provided to the client application 134 when the secure communication session was established. In one example, the validation message can include the application identifier encrypted by an encryption key. The session identifier can also be included in the validation message in encrypted or plaintext form apart from an encrypted payload of the validation message.

At step 253, the server application 135 can validate the validation message. The server application 135 can perform this validation step by verifying that the application identifier or session identifier that is encrypted in the validation message matches data stored in the session data 155 of the server application 135. If the validation message was encrypted using different encryption data 159 corresponding to the session or was not encrypted at all, the validation will fail and the server application 135 can ignore the validation message.

If the validation is successful, the server application 135 can generate an encrypted message at step 255. The encrypted message can include an authentication credential, authentication token, or any other data that the server application 135 can communicate to the client application 134. The encrypted message is encrypted using the encryption data 159 previously generated for the secure communication session.

At step 257, the encrypted message can be sent to the client application 134. The encrypted message can be sent using the insecure communication API 133 provided by the operating system 131. The client application 134 can optionally reply to the encrypted message with another encrypted message that is encrypted using the encryption data 159 for the secure communication session. The reply can also be sent using the insecure communication API 133. In this way, a secure communications channel can be established over an insecure communication API 133.

Figure 3:
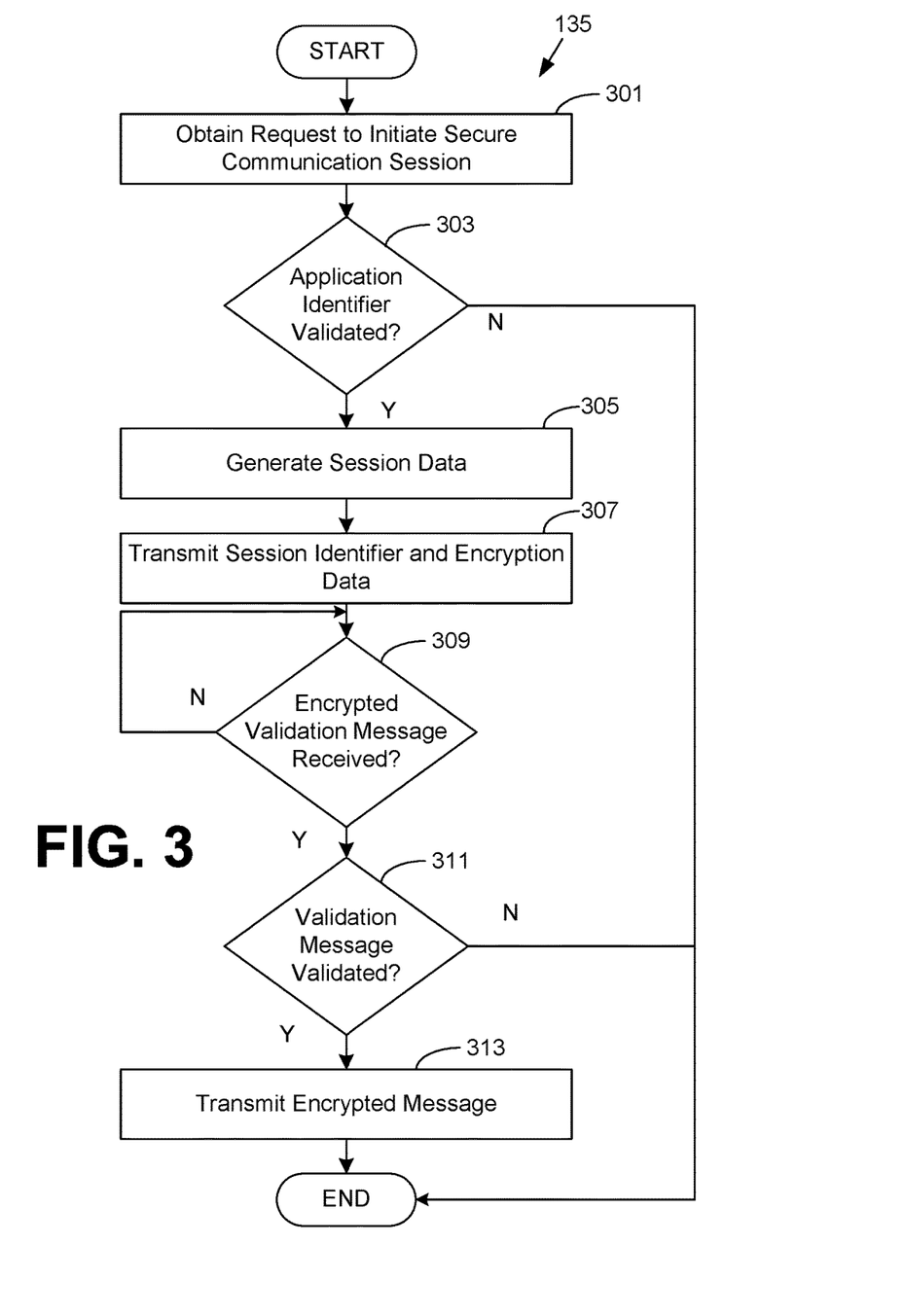
FIG. 3 is a flowchart that illustrates functionality according to a third example of the disclosure.

Referring next to FIG. 3, shown is a flowchart that provides one example of how the server application 135 can establish a secure communication session with another application installed on the client device, such as a client application 134. First, at step 301, the server application 135 can obtain a request to initiate or create a secure communication session. The request can be obtained from a client application 134 through the application-to-application communication API 132.

At step 303, the server application 135 can attempt to validate the application identifier associated with the request. As noted above, messages sent using the application-to-application communication API 132 can be associated with the application identifier of the sending application by the operating system 131. Accordingly, in one example, at step 303, the server application 135 can extract the application identifier and determine whether the client application 134 is a whitelisted application based upon whether the application identifier is whitelisted. If not, the process can proceed to completion, as the server application 135 can ignore the request from the client application 134. If the application identifier is validated at step 303, the process can proceed to step 305.

At step 305, the server application 135 can generate session data 155 corresponding to a secure communication session between the client application 134 and server application 135. The session data 155 can include a session identifier 157 and encryption data 159 that can be used to secure or encrypt communications between the applications.

At step 307, the server application 135 can transmit the session identifier 157 and encryption data 159 to the client application 134. The session identifier 157 and encryption data 159 can be communicated to the client application 134 using the application-to-application communication API 132. The secure communication session between the server application 135 and client application 134 can be considered to be established.

At step 309, the server application 135 can await an encrypted validation message from the client application 134. The encrypted validation message can be sent using the insecure communication API 133 provided by the operating system 131. As noted above, the validation message can include the application identifier or session identifier 157 encrypted using the encryption data 159. Once an encrypted validation message is received, the process can proceed to step 311.

At step 311, the server application 135 can validate the validation message by verifying that the session identifier or application identifier contained within the validation message corresponds to a session identifier 157 or application identifier contained within the session data 155 of the server application 135. If the server application 135 is unable to validate the validation message, the process proceeds to completion, as the server application 135 can ignore the transmission. If the validation message is validated at step 311, the process proceeds to step 313.

At step 313, the server application 135 can generate and transmit an encrypted message to the client application 134. The encrypted message can be sent using the insecure communication API 133. The message can be encrypted using the encryption data 159 corresponding to the session created by the server application 135. In some examples, the server application 135 can also receive encrypted messages from the client application 134 that are encrypted using the encryption data 159. In this way, a secure communication session is implemented over an insecure communication API 133.

Figure 4:
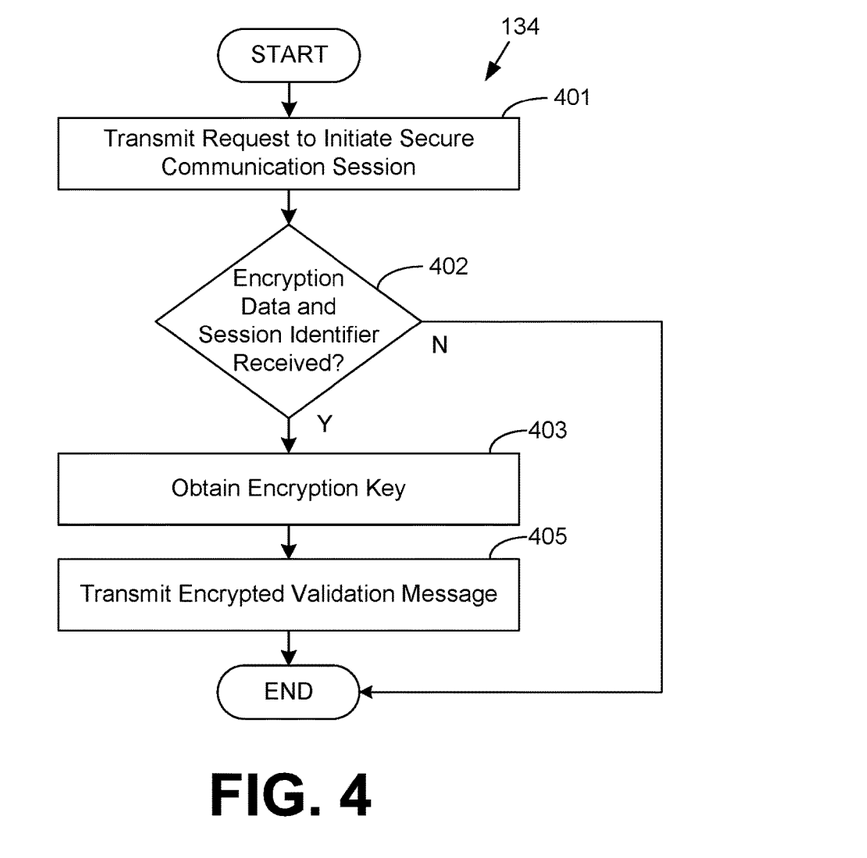
FIG. 4 is a flowchart that illustrates functionality according to a fourth example of the disclosure.

Referring next to FIG. 4, shown is a flowchart that illustrates how the client application 134 can initiate a secure communication session with a server application 135. First, at step 401, the client application 134 can transmit a request to communicate with the server application 135 over a secure communication session. The request can be sent using the application-to-application communication API 132 provided by the operating system.

At step 402, if the server application 135 has validated the request, the client application 134 can receive encryption data 159 as well as a session identifier 157 corresponding to a secure communication session generated by the server application 135. Thereafter, the process can proceed to step 403. If no encryption data 159 or session identifier 157 is received, the process can proceed to completion, as the server application 135 was unable or unwilling to generate a secure communication session with the client application 134.

At step 403, the client application 134 can obtain encryption key by generating an encryption key using the encryption data 159 from the server application 135 or extracting the encryption key from the encryption data 159 from the server application 135. In some instances, the encryption data 159 from the server application 135 can include a symmetric key. In other instances, the encryption data 159 can include data from which the symmetric key is generated.

Next, at step 405, the client application 134 can transmit an encrypted validation message to the server application 135. The validation message can be sent using an insecure communication API 133 provided by the operating system 131. The validation message can include the application identifier or session identifier encrypted using the encryption key. Thereafter, the client application 134 can communicate with the server application 135 through the secure communication session established between the applications. Thereafter, the process can proceed to completion.

The flowcharts and sequence diagrams of FIGS. 2A-4 show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagrams of FIGS. 2A-4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system for providing a secure communication protocol between a first application and a second application comprising:
 a client device comprising a processor and a memory, the client device executing the first application and the second application, the client device configured to at least:
  generate, by the first application, a request to generate a secure communication session, the request sent through an operating system application-to-application communication protocol, the request further including a first application identifier identifying the first application and wherein communications sent using the application-to-application communication protocol cannot be accessed by other applications installed on the client device;
  obtain, in the second application, the request from the first application;
  generate, by the second application, session data corresponding to the request from the first application;
  validate, by the second application, the first application identifier;
  in response to validating the first application identifier, generate, by the second application, encryption data for the secure communication session;
  transmit the encryption data and a session identifier to the first application through the operating system application-to-application communication protocol; and
  establish the secure communication session between the first application and the second application through an operating system application programming interface (API), wherein communication between the first application and the second application is secured with the encryption data and the operating system API comprises a token store where applications installed on the client device can store or retrieve authentication tokens associated with a plurality of uniform resource identifiers (URI's), the token store being accessible to other applications installed on the client device.

2. The system of claim 1, wherein the encryption data comprises a symmetric key or data from which the symmetric key can be generated.

3. The system of claim 2, wherein the first application and the second application are instrumented to generate the symmetric key using an encryption protocol, wherein the encryption protocol is not specified in the request from the first application.

4. The system of claim 1, wherein the first application identifier is embedded within a validation message, the validation message comprising the first application identifier and being encrypted using the encryption data.

5. The system of claim 4, wherein the first application is configured to transmit the session identifier with the validation message to the second application.

6. The system of claim 4, wherein the second application is configured to validate the validation message and establish the secure communication session in response to validation of the validation message.

7. The system of claim 6, wherein the second application validates the validation message by verifying that the first application identifier corresponds to the session data generated by the second application.

8. The system of claim 1, wherein the operating system API comprises an insecure communication protocol.

9. A method for providing a secure communication protocol between a first application executed by a client device and a second application executed by the client device comprising:

generating, by the first application, a request to generate a secure communication session, the request sent through an operating system application-to-application communication protocol, the request further including a first application identifier identifying the first application and wherein communications sent using the application-to-application communication protocol cannot be accessed by other applications installed on the client device;

obtaining, in the second application, the request from the first application;

generating, by the second application, session data corresponding to the request from the first application;

validating, by the second application, the first application identifier;

in response to validating the first application identifier, generating, by the second application, encryption data for the secure communication session;

transmitting the encryption data and a session identifier to the first application through the operating system application-to-application communication protocol; and establishing the secure communication session between the first application and the second application through an operating system application programming interface (API), wherein communication between the first application and the second application is secured with the encryption data and the operating system API comprises a token store where applications installed on the client device can store or retrieve authentication tokens associated with a plurality of uniform resource identifiers (URI's), the token store being accessible to other applications installed on the client device.

10. The method of claim 9, wherein the encryption data comprises a symmetric key or data from which the symmetric key can be generated.

11. The method of claim 10, wherein the first application and the second application are instrumented to generate the symmetric key using an encryption protocol, wherein the encryption protocol is not specified in the request from the first application.

12. The method of claim 9, wherein the first application identifier is embedded within a validation message, the validation message comprising the first application identifier and being encrypted using the encryption data.

13. The method of claim 12, further comprising transmitting, by the first application, the validation message to the second application.

14. The method of claim 12, further comprising validating, by the second application, and establishing the secure communication session in response to validation of the validation message.

15. The method of claim 9, wherein the operating system API comprises an insecure communication protocol.

16. A non-transitory computer-readable medium comprising machine-readable instructions providing a secure communication protocol between a first application and a second application, wherein when executed by a processor of a client device, the machine-readable instructions cause the client device to at least:

generate, by the first application, a request to generate a secure communication session, the request sent through an operating system application-to-application communication protocol, the request further including a first application identifier identifying the first application and wherein communications sent using the application-to-application communication protocol cannot be accessed by other applications installed on the client device;

obtain, in the second application, the request from the first application;

generate, by the second application, session data corresponding to the request from the first application;

validate, by the second application, the first application identifier;

in response to validating the first application identifier, generate, by the second application, encryption data for the secure communication session;

transmit the encryption data and a session identifier to the first application through the operating system application-to-application communication protocol; and establish the secure communication session between the first application and the second application through an operating system application programming interface (API), wherein communication between the first application and the second application is secured with the encryption data and the operating system API comprises a token store where applications installed on the client device can store or retrieve authentication tokens associated with a plurality of uniform resource identifiers (URI's), the token store being accessible to other applications installed on the client device.

17. The non-transitory computer-readable medium of claim 16, wherein the encryption data comprises a symmetric key or data from which the symmetric key can be generated.

18. The non-transitory computer-readable medium of claim 17, wherein the first application and the second application are instrumented to generate the symmetric key using an encryption protocol, wherein the encryption protocol is not specified in the request from the first application.

19. The non-transitory computer-readable medium of claim 16, wherein the first application identifier is embedded within a validation message, the validation message comprising the first application identifier and being encrypted using the encryption data.

20. The non-transitory computer-readable medium of claim 19, wherein the first application is configured to transmit the session identifier with the validation message to the second application.

* * * * *